United States Patent
Milici et al.

(10) Patent No.: US 6,785,608 B1
(45) Date of Patent: Aug. 31, 2004

(54) SYSTEM AND METHOD FOR CALCULATING AN OPTIMIZED ROUTE AND CALCULATION THEREOF

(75) Inventors: Mike Milici, Chicago, IL (US); Xue Tan, Oak Park, IL (US)

(73) Assignee: Navteq North America, LLC, Chicago, IL (US)

(*) Notice: Subject to any disclaimer, the term of this patent is extended or adjusted under 35 U.S.C. 154(b) by 156 days.

(21) Appl. No.: 10/026,503

(22) Filed: Dec. 19, 2001

(51) Int. Cl.[7] ............................................. G01C 34/00
(52) U.S. Cl. ...................... 701/209; 701/202; 701/210; 340/995.19
(58) Field of Search ................................. 701/202, 209, 701/210; 340/995.21, 995.19

(56) References Cited

U.S. PATENT DOCUMENTS

| | | | | |
|---|---|---|---|---|
| 5,041,983 A | * | 8/1991 | Nakahara et al. | 701/209 |
| 5,371,678 A | * | 12/1994 | Nomura | 701/210 |
| 5,608,635 A | * | 3/1997 | Tamai | 701/209 |
| 5,729,458 A | | 3/1998 | Poppen | 364/464.1 |
| 5,774,073 A | * | 6/1998 | Maekawa et al. | 340/995.21 |
| 5,899,955 A | * | 5/1999 | Yagyu et al. | 701/209 |
| 6,034,626 A | * | 3/2000 | Maekawa et al. | 340/995.21 |
| 6,125,323 A | * | 9/2000 | Nimura et al. | 701/207 |
| 6,192,314 B1 | | 2/2001 | Khavakh et al. | 701/209 |
| 6,249,742 B1 | * | 6/2001 | Friederich et al. | 701/202 |
| 6,317,685 B1 | * | 11/2001 | Kozak et al. | 701/210 |
| 6,321,158 B1 | * | 11/2001 | DeLorme et al. | 701/201 |
| 6,321,161 B1 | * | 11/2001 | Herbst et al. | 701/210 |
| 6,363,319 B1 | | 3/2002 | Hsu | 701/202 |
| 6,505,120 B2 | * | 1/2003 | Yamashita et al. | 701/211 |
| 6,577,949 B1 | * | 6/2003 | Robinson et al. | 701/209 |
| 2003/0069683 A1 | * | 4/2003 | Lapidot et al. | 701/117 |

* cited by examiner

Primary Examiner—Gary Chin
(74) Attorney, Agent, or Firm—Frank J. Kozak; Jon D. Shutter; Lawrence M. Kaplan

(57) ABSTRACT

A bounding route is calculated between two physical locations to determine a boundary value for which subsequent route calculations or portions thereof may be compared to. The bounding route may be calculated by selecting segments of roads that satisfy certain criteria. These criteria may be based on weighting factors or parameters such as the "least distance traveled" or the "least travel time." The bounding route and the value may then provide any route calculation program with criteria used to determine whether a search at a particular location should continue. That is, if a search at a particular location has exceeded the criteria, or equivalently, the search has gone beyond the boundary, the search is stopped because it will most likely result in an un-optimal route. This process may then be an iterative one until an optimal search with a value less than the boundary value is found.

14 Claims, 11 Drawing Sheets

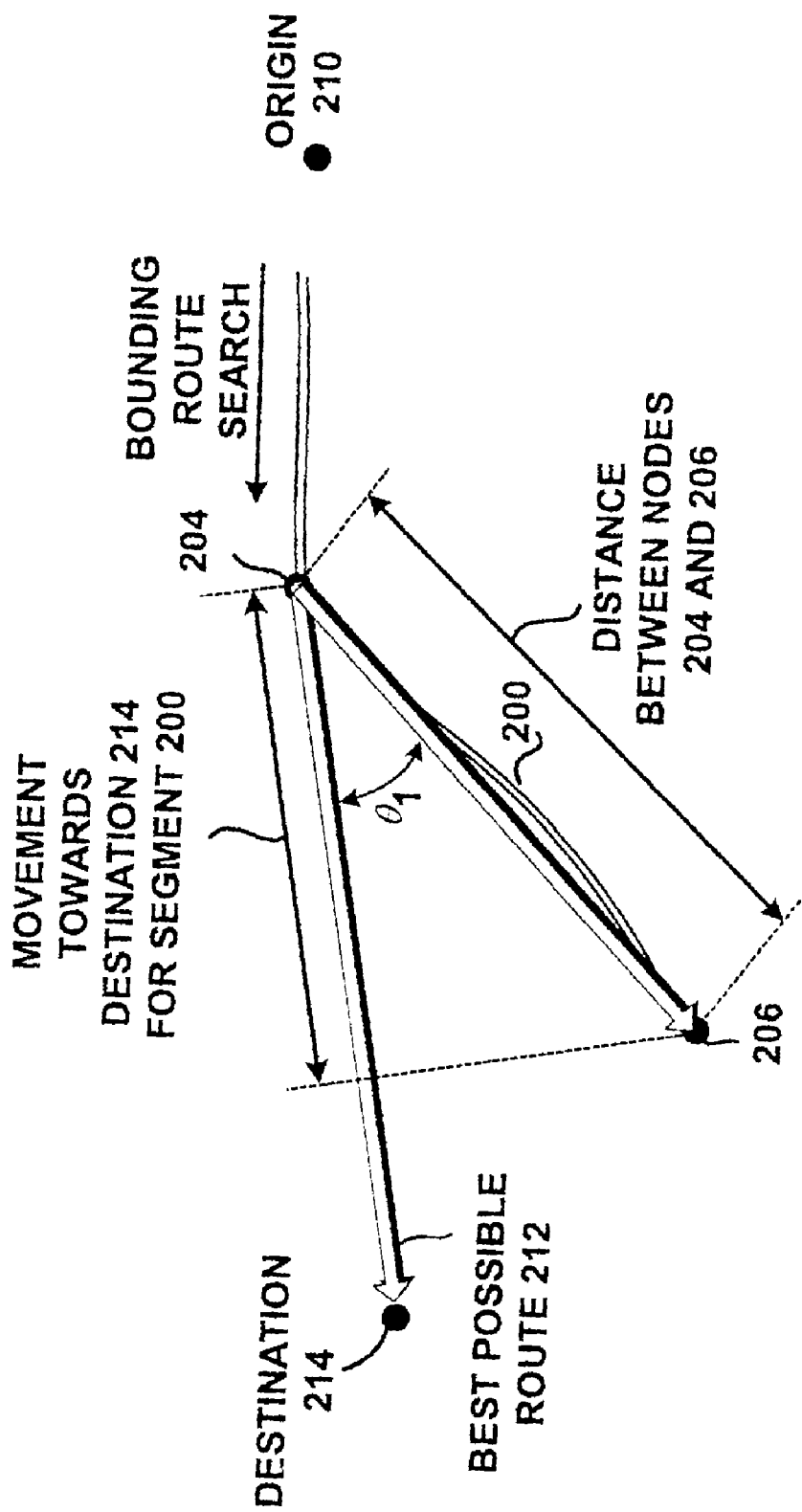

US 6,785,608 B1

SYSTEM AND METHOD FOR CALCULATING AN OPTIMIZED ROUTE AND CALCULATION THEREOF

FIELD OF THE INVENTION

The present invention relates to a system and method for calculating an optimized route in a navigation program.

BACKGROUND

Computer-based navigation systems are able to provide end users, such as vehicle drivers and other travelers, with various navigating functions and features. For example, some navigation systems are able to determine an optimum route to travel by driving and/or walking between two physical locations in a geographic region. Using input from the end user, and optionally from equipment that can determine the end user's physical location (such as a global positioning system), a navigation system can identify and examine various routes between the two locations in the geographic region to determine an optimum route between the locations.

The navigation system may then provide the end user with information about the route in the form of instructions that identify the maneuvers required to be taken by the end user to travel from the starting location to the destination location. The navigation system may be located in an automobile or at an office remote from the end user, and the instructions may take the form of textual and/or audio instructions that are provided to the end user. Some navigation systems are capable of providing detailed moving map displays outlining the route between locations, the types of maneuvers to be taken along the route, locations of certain types of features or points of interest, and so on.

To provide these and other navigating functions, present navigation systems include navigation application programs and use one or more detailed databases that include data, which represent physical geographic navigable features. The detailed database(s) include data representing the road networks in a geographic region, including the roads and intersections in the region and information about the particular roads and intersections, such as one-way streets, turn restrictions at intersections, speed limits along the roads, street names of the various roads, address ranges along the various roads and so on. Further, the data may include information about points-of-interest such as restaurants, hotels, and so on. Presently, the collection of such geographic data and the provision of such data in a computer-usable database format are provided by Navigation Technologies of Chicago, Ill.

Present navigation systems may then use the data represented in the one or more detailed database(s) to provide a route optimized for time or distance between the designated physical locations. To do this, the navigation application program may exhaustively search the data that represents the road networks in a particular geographic region. Accordingly, the navigation application program may calculate and subsequently compare many possible routes between the two locations to determine the optimal solution.

This laborious approach, however, requires that the program calculate and then compare as many possible routes as the program can find in the particular geographic region, some of which are clearly less optimal than the previously calculated routes when parameters such as time or distance are considered. Moreover, this methodology may require that the program completely calculate a route between the two locations before the route can be compared to other previously calculated routes. This approach may then be a computationally intensive one and may unnecessarily slow the route calculation process especially when trying to optimize the route for a particular parameter such as time or distance.

Accordingly, it is an objective to provide a method and system for an optimized route and calculation thereof.

SUMMARY

A system and method provide for an optimized route and calculation thereof. The exemplary embodiments are implemented with a route calculation program used with a map database stored on a computer readable storage medium. The route calculation program is adapted to find a solution route between a first location on a road network represented by the map database and a second location on the road network represented by the map database. The road network is represented in the map database by data that represent each segment of each road between endpoints thereof that correspond to intersections of the segment of road with other segments of roads.

In an exemplary embodiment, a "bounding route" is calculated with a relatively fast algorithm between two physical locations to determine a boundary value for which subsequent route calculations or portions thereof may be compared to. The bounding route may be calculated by selecting segments of roads that are optimized for a specific criterion. The criterion may be based on weighting factors or parameters such as the "least distance traveled" or the "least travel time."

In another exemplary embodiment, a boundary value may provide any route calculation program with criteria used to determine whether a search at a particular location should continue. That is, if a search at a particular location has exceeded the criteria, or equivalently, the search has gone beyond the boundary, the search is stopped because it will result in an un-optimal route for the criterion. Moreover, the route calculation program may use its resources to pursue a potentially better route at a different location. This process may then be an iterative one until an optimal solution is found.

The navigation application program may efficiently calculate a bounding route and value that has a characteristic that meets a specific criterion. Moreover, the program may subsequently compare many possible routes between the two locations to determine the optimal solution for the specific criterion in a quick and efficient manner. Furthermore, the program can compare values for subsequent routes with the boundary value before having to completely calculate a route. This provides for a less computational process especially when trying to optimize the route's characteristic such as travel time or distance traveled for a specific criterion such as "least travel time" or "least distance traveled."

BRIEF DESCRIPTION OF THE DRAWINGS

FIGS. 3A and 3B show a way to determine which segment of FIG. 2 that better satisfies a specific criterion;

DETAILED DESCRIPTION

I. Overview of a Bounding Route Calculation

Figure 1:
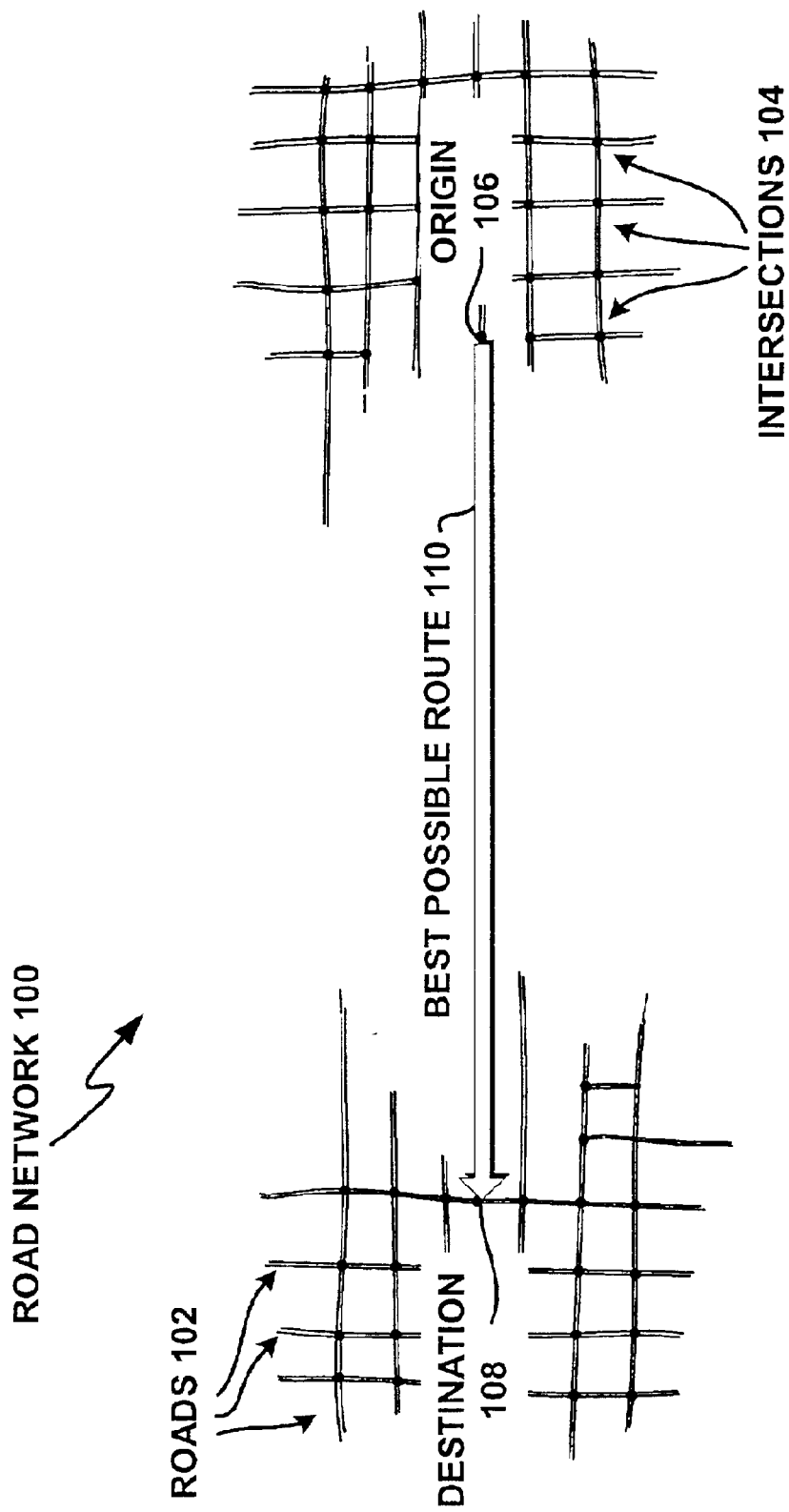
FIG. 1 shows a portion of a physical road network within a geographic region.

FIG. 1 shows a portion of a physical road network 100 within a geographic region. The road network 100 illustrates geographic navigable features, which among other things may, include roads 102 and intersections 104 of the roads 102. Each of the geographic features may be identified by its physical location (latitude, longitude, and optionally, absolute or relative altitude). Other geographic features not shown in the road network 100 may include point-of-interest locations such as a hotel, civic center, restaurant, and so on.

Also shown within the road network 100 is a specified origin 106 and destination 108. Various roads and intersections may connect the origin 106 with the destination 108 to form a route of travel, whether driving and/or walking, between the two locations. Moreover, the origin 106 and the destination 108 may be connected by, for example, canals or waterways, or a combination of waterways and roads, etc. Nonetheless, one or more routes may exist between the origin 106 and the destination 108 to provide an established or selected course of travel.

According to the exemplary embodiment, a "bounding route" is first calculated between the two locations 106, 108 to determine a boundary value for which subsequent route calculations or portions thereof may be compared to. The bounding route has a characteristic associated with it, such as the time it takes to travel the route, referred to as "travel time", or the distance to drive or walk the route, referred to as "distance traveled." The characteristic may be optimized for a specific criterion such as the "least travel time" or "least distance traveled."

These criteria may be based on weighting factors or parameters. For example, to calculate a route optimized for the criterion of "least distance traveled," the bounding route may made up of segments of roads, such that each segment provides the most movement towards the destination per unit length of the segment. To calculate a route optimized for the criterion of "least travel time," the bounding route may made up of segments of roads, such that each segment provides the greatest percent of travel towards the destination per the time to travel the segment. Note also that by satisfying either of the above criterions, the bounding route segments may geographically follow along the best possible route 110 rather well. Nevertheless, the best possible route 10 is only illustrated in FIG. 1 to assist in understanding the calculation of the bounding route. It should also be understood that there might be other characteristics and criterion besides those that are listed above.

The bounding route may then be used to determine a boundary value. The boundary value may provide any route calculation program with value used to determine whether a search at a particular location should continue. That is, if a search at a particular location has exceeded the value, or equivalently, the search has gone beyond the boundary value, the search may be stopped in order to pursue a potentially better route at a different location. This process may then be an iterative one until an optimal solution is found.

To better illustrate the calculation of a bounding route and value, examples below are provided to show how individual segments are selected to optimize the route for a particular criterion. Then, actual bounding route calculation examples are provided such that the selected segments are assembled to form a bounding route between an origin and destination. In one example, the bounding route value calculation is optimized for the least distance between the two locations. In the other example, the bounding route value calculation is optimized for the least travel time between the two locations. Finally, examples are provided to illustrate how a route calculation program might use the bounding route value to find an optimal solution in a computationally efficient manner.

II. Selecting A Segment

By satisfying the criterion such as the "least distance traveled," or "least time traveled," the bounding route segments may geographically follow along the best possible route 110. Generally, the bounding route may be calculated by only selecting segments of roads that have characteristics that are optimized for the specific criterion. The bounding route is then formed by assembling all the selected segments to form a route or path between the origin 106 and the destination 108. Below are examples that illustrate how the bounding route search might determine which segments best satisfy each criterion. However, before continuing, it may be helpful to understand more about road segments and their corresponding nodes.

Figure 2:
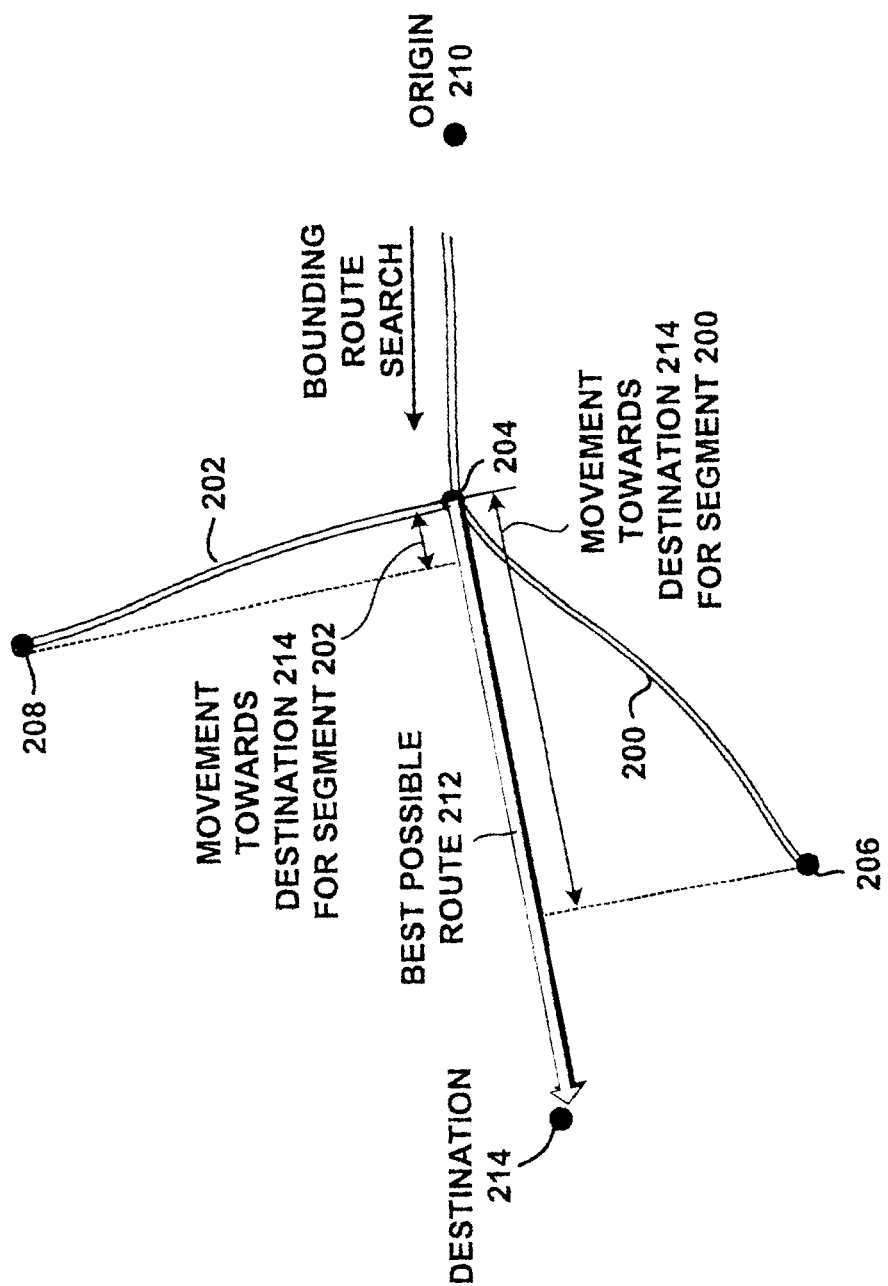
FIG. 2 shows two road segments intersecting at a common node.

FIG. 2 shows two road segments 200 and 202 intersecting at a common node 204. Each segment has associated with it two nodes. For example, segment 200 has two nodes 204 and 206 associated with it. Segment 202 has nodes 204 and 208 associated with it. One of the two nodes represents the point at one end of the segment and the other node represents the point at the other end of the segment. The node at either end of a segment may correspond to a location at which the road meets another road such as an intersection, or where the road dead-ends or terminates.

A. Selecting a Segment for the Least Distance Traveled

Assuming a bounding route search is initiated from the origin 210 and progresses to node 204. At node 204, the bounding route search may then determine which characteristic of the two segments 200, 202 bests satisfies the criterion of "least distance traveled." That is, which of the segments 200, 202 provide the most movement towards the destination per unit length of road. The segment with the most movement towards the destination per unit length of road is then selected and added to the list of selected segments, which are ultimately used to form a bounding route and value.

To determine which segment 200, 202 provides the most movement towards the destination per unit length of the road, one can project each segment 200, 202 onto the best possible route 212 as shown in FIG. 2. The corresponding segment 200, 202 of the projection with the most movement towards the destination 214 best satisfies the criterion. In this example, it is shown that the projection of segment 200 has more movement towards the destination per unit length of road than the projection of segment 202. Thus, segment 200 may be added to the list of segments that make up the bounding route between the origin 210 and the destination 214. Note also, that segment 200 geographically follows along the best possible route 212 better than segment 202.

Figure 3B:
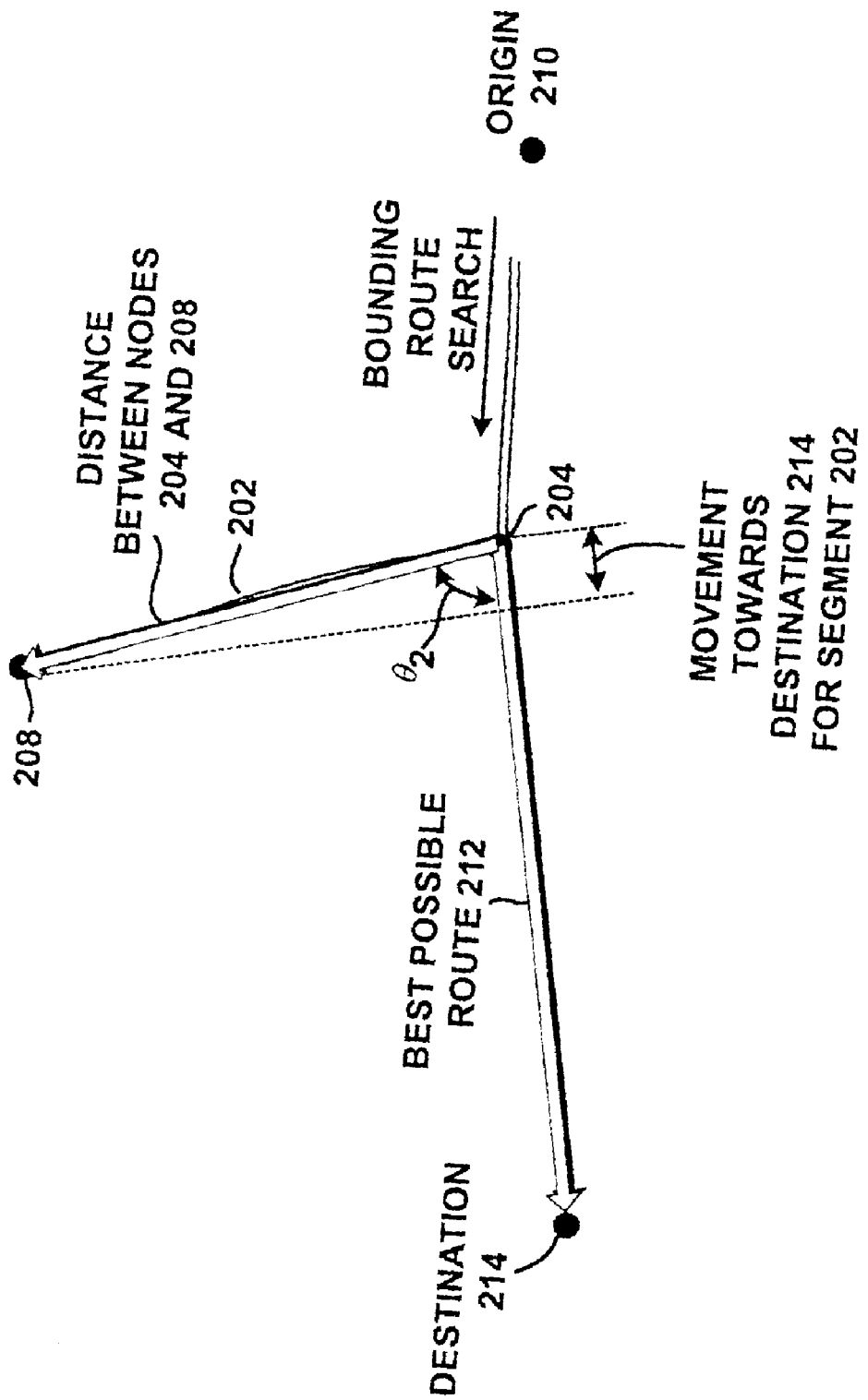

FIGS. 3A and 3B illustrate a way to determine which segment 200, 202 better satisfies the criterion given by the "least distance traveled."

(1) For Segment 200

Referring first to FIG. 3A, to determine the movement towards the destination per unit length of road for segment 200, the straight line distance between the node 204 and the node 206, or $DIST_{204,206}$, is determined. In this example, assume that $DIST_{204,206}=20$ km. Also, the angle $\theta_1$ formed between the best possible route 212 and segment 200 is determined. Assume that for this example $\theta_1=30°$.

Then, the movement towards the destination 214 for segment 200, or $Movement_{200}$, may be calculated: $DIST_{204,206}(\cos \theta 1)=Movement_{200}$. Thus, according to this relationship 20 km(cos 30°)=$Movement_{200}$=4.33 km.

Next, $Movement_{200}$ is divided by the length of the segment 200 to provide the $$\frac{Movement_{200}}{Length\ Of\ Segment_{200}},$$

which provides the movement traveled per length of distance. In this example, assume for segment 200 that the Length Of $Segment_{200}$=5 km. Then $$\frac{Movement_{200}}{Length\ Of\ Segment_{200}} = \frac{4.33}{5} = 0.886.$$

(2) For Segment 202

Turning now to FIG. 3B, to determine the movement towards the destination per unit length of road for segment 202, the straight line distance between the node 204 and the node 208, or $DIST_{204,208}$, is determined. Assume for this example that $DIST_{204,208}=20$ km. Furthermore, the angle $\theta_2$ formed between the best possible route 212 and segment 202 is determined. Assume that for this example $\theta_2=80°$.

Then, the movement towards the destination 214 for segment 202, or $Movement_{202}$, may be calculated: $DIST_{204,208}(\cos \theta 2)=Movement_{202}$. Thus, according to this relationship 5 km(cos 80°)=$Movement_{202}$=0.868 km.

Next, $Movement_{202}$ is divided by the length of the segment 202 to provide the $$\frac{Movement_{202}}{Length\ Of\ Segment},$$

which provides the movement traveled per length of distance. In this example, assume for segment 202 that the Length Of $Segment_{202}$=5 km. Then $$\frac{Movement_{202}}{Length\ Of\ Segment_{202}} = \frac{0.868}{5} = 0.1736.$$

Thus, segment 200 has more movement towards the destination per unit length of road than segment 202 (0.866≧0.1736). Consequently, segment 200 may be added to the list of segments that make up the bounding route between the origin 210 and the destination 214.

(3) Alternate Embodiment for Selecting a Segment for the Least Distance Traveled According to an alternate embodiment, once a bounding route search arrives at a node with more than one candidate segment, the search determines the straight-line distance at the end of each candidate segment to the destination. Moreover, the search determines the lengths of each segment already selected in determining the bounding route. Then the lengths of each selected segment plus the length of one candidate segment is totaled and added to the straight-line distance for each corresponding candidate segment. This is repeated for as many times as there are candidate segments. The candidate segment that corresponds with the route that has the shortest estimated bounding route distance is selected and added to the bounding route.

For example, referring back to FIG. 2, assume that the lengths of each segment selected from the origin 208 to node 202 totals to a value "X." Then, for candidate segment 200, the distance along segment 200 and the straight-line distance from node 204 to the destination 206 are added to "X" to give an estimated bounding route distance for candidate segment 200 (X+length of segment 200+straight-line distance from node 204 to the destination 206=estimated bounding route distance for segment 200). This is repeated for the candidate segment 210, except that the distance along segment 210 and the straight-line distance from node 212 to the destination 206 are added to "X" to give an estimated bounding route distance for candidate segment 210 (X+length of segment 210+straight-line distance from node 212 to the destination 206=estimated bounding route distance for segment 210). In this example, segment 200 would be selected because it is the segment that corresponds with the route that has the shortest estimated bounding route distance. This process may continue until a bounding route is formed.

B. Selecting a Segment for the Least Time Traveled (1) For Segment 200

Referring to FIG. 3A, the movement towards the destination 214 per unit length of road for segment 200, or $Movement_{200}$, may be calculated. From the earlier example, the 20 km(cos 30°)=$Movement_{200}$=4.33 km. Next, $Movement_{200}$ is divided by the length of the segment 200 to provide $$\frac{Movement_{200}}{Length\ Of\ Segment_{200}} = \frac{4.33}{5} = 0.886$$

(also calculated in the earlier example).

Then, the length of the segment 200 is divided by the speed category or posted speed to determine an estimated travel time for segment 200. Assume that the speed limit is 100 km/h. Then, the $$estimated\ time\ travel_{200} = \frac{5}{100} = 0.05$$

from node 204 to node 206 over segment 200. The percent of route traveled per unit of time over segment 200 is $$\frac{Movement_{200} Traveled\ Per\ Distance}{Estimated\ Travel\ Time_{200}} = \frac{0.866}{0.05} = 17.32.$$

(2) For Segment 202

Referring back to FIG. 3B, the movement towards the destination 214 per unit length of road for segment 202, or $Movement_{202}$, may be calculated. From the earlier example, the 5 km(cos 80°)=Movement$_{202}$=0.868 km. Next, Movement$_{202}$ is divided by the length of the segment 202 to provide $$\frac{\text{Movement}_{202}}{\text{Length Of Segment}_{202}} = \frac{0.868}{5} = 0.1736$$

(also calculated in the earlier example).

Then, the length of the segment 202 is divided by the speed category or posted speed to determine estimated travel time$_{202}$ for segment 202. Assume that the speed limit is 100 km/h. Then, the $$\text{estimated time travel}_{200} = \frac{5}{100} = 0.05$$

from node 204 to node 206 over segment The percent of route traveled per unit of time over segment 202 is $$\frac{\text{Movement}_{202}\text{Traveled Per Distance}}{\text{Estimated Travel Time}_{202}} = \frac{0.1736}{0.05} = 3.47.$$

Thus, segment 200 has move percent of the route traveled per unit of time than segment 202 (17.32≧3.47). Consequently, segment 200 may be added to the list of segments that make up the bounding route between the origin 210 and the destination 214.

(3) Alternate Embodiment for Selecting a Segment for the Least Time Traveled

According to an alternate embodiment, once a bounding route search arrives at a node with more than one candidate segment, the search determines the straight-line travel time (fastest speed) from the end of the corresponding candidate segment to the destination. Moreover, the search determines the travel times of each segment already selected in determining the bounding route. Then the travel times of each selected segment plus the travel time of one candidate segment is totaled and added to the straight-line travel time for each corresponding candidate segment. This is repeated for as many times as there are candidate segments. The candidate segment that corresponds with the route that has the lowest overall estimated travel time is selected and added to the bounding route.

III. Examples for Calculating a Bounding Route
A. The Least Distance Traveled

Figure 4:
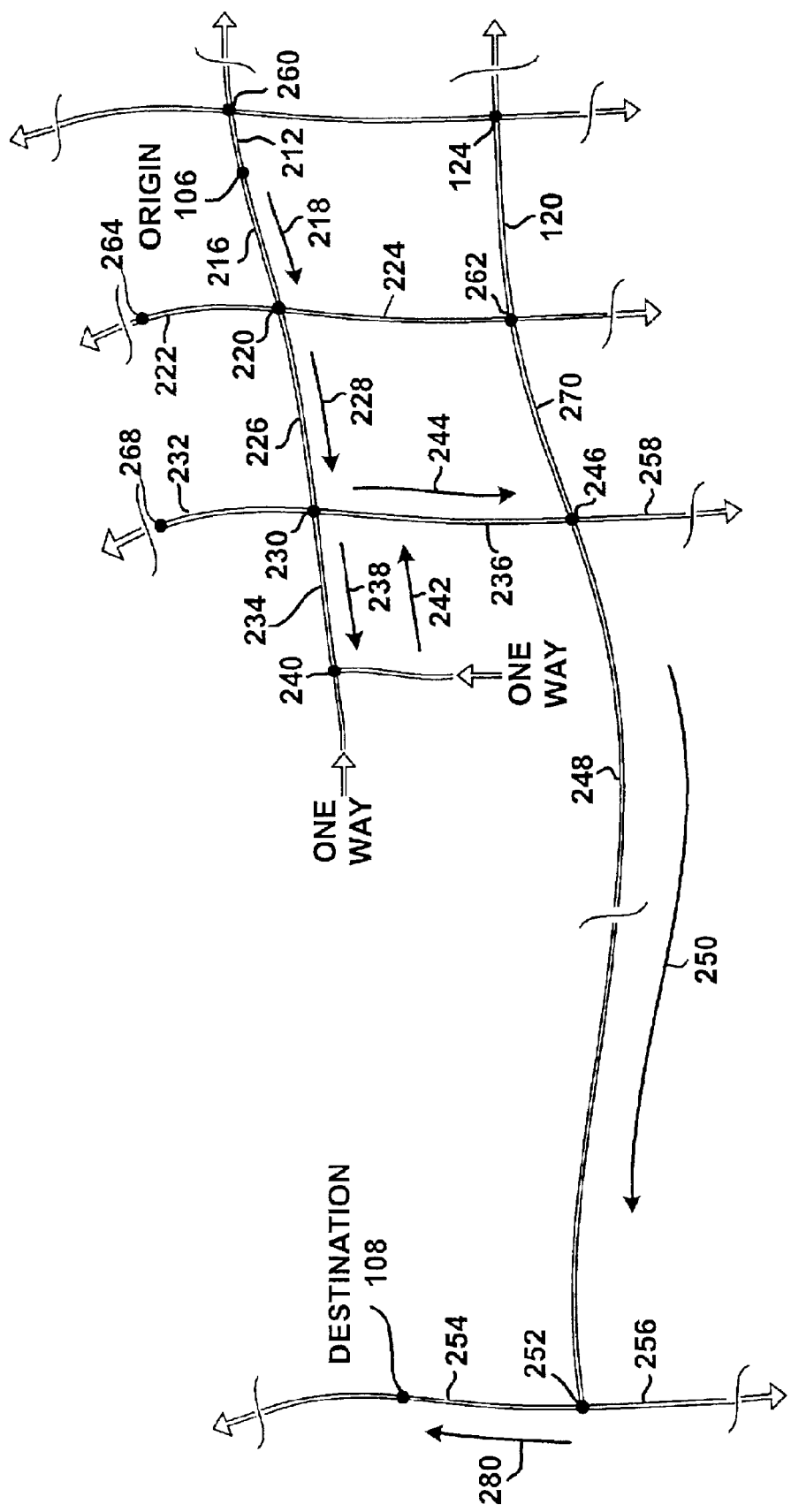
FIG. 4 shows in more detail, a part of the road network in FIG. 1 to illustrate the determining of a bounding route.

FIG. 4 shows in more detail, a part of the road network in FIG. 1, to illustrate the determination of a bounding route. Although the bounding route search may initiate at the destination 108, assume for this example that the search is initiated at the origin 106.

At the origin 106, the bounding route search may determine which of the segments 216 or 212 provides the most movement towards the destination 108 per unit length of the segment. Using the techniques described above, however, segment 216 has a larger movement traveled per length of distance than segment 212. Thus, segment 216 is added to the list of segments that make up the bounding route between the origin 106 and the destination 108. The search would follow in the direction of arrow 218 to node 220.

At node 220, the bounding route search would call for any successor segments, and thus segments 222, 224, and 226 would be examined. Segment 226 has a larger movement of travel per length of distance than either segment 222 or 224. Thus, the search would select the segment 226 and would follow in the direction of arrow 228 to node 230.

At node 230, the bounding route search would again retrieve any successor segments, which include segments 232, 234, and 236. Again, for similar reasons above, the search may select segment 234 as the best possible segment. Alternatively, the search may realize that segment 234 dead-ends and thus would not select or further search the segment. In any event, if the search selects segment 234, it would follow in the direction of arrow 238 to node 240.

At node 240, the bounding route search may determine that there are not any successor segments that lead away from node 240. The search may then use a node stack, described below to prioritize and keep record at each searched node a collection of previously un-searched segments. The node stack, described below, allows the search to "backup" to a particular node when a search fails (e.g., segment terminates, etc.). According to this example, the previous node searched was node 230. Consequently, the search would backup along arrow 242 to node 230.

At node 230, the un-searched successor segments 232 and 236 would be called. Segment 226 has already been explored, so the search would not explore it further. Segments 232 and 236 haven't yet been explored, so the search selects one of the two segments. Assume for this example that segment 236 has more movement traveled per length of distance. Thus the search would select segment 236 and proceed along arrow 244 to node 246.

At node 246, the bounding route search, for similar reasons above, would select segment 248 as the best segment. Accordingly, the search selects segment 248 in the direction of arrow 250 to node 252.

At node 252, the bounding route search would retrieve successor segments 254 and 256. Using one of the above techniques, segment 254 would be selected. The bounding route search would locate and match the destination 108.

Then, the path along arrows 218, 228, 244, 250, and 280 is one possible bounding route calculation. Thus, the bounding route path includes the nodes 160, 220, 230, 246, and 252 to the destination at 108. For each segment, the characteristic is used to calculate the boundary value of the path between the origin 106 and the destination 108. Note that the selected segments 216, 226, 236, 248 and 254 remain geographically close to the best possible route 110. Of course, how close the selected segments are to the best possible route 110 depends on the layout of a particular road network.

B. The Least Travel Time

Similar to the example above, a route calculation program may initiate a search at the origin 106 to determine a bounding route that is optimized for least travel time. In the above example, however, it was often visually apparent which segment had the larger movement traveled per length of distance. This is not necessarily true for optimization for least travel time. For example, even though a particular segment may geographically look like the better segment to travel to reach the destination, the posted speed limit may make it the slower route when compared to another possible segment. Thus, using the above techniques a search may calculate the percent of route traveled per unit of time for each segment and based on the values, would choose to explore the segment with the highest value. This search may or may not have the same results as the previous example in which least distance traveled was optimized.

C. Node Stack for Use in Calculating a Bounding Route

Figure 5:
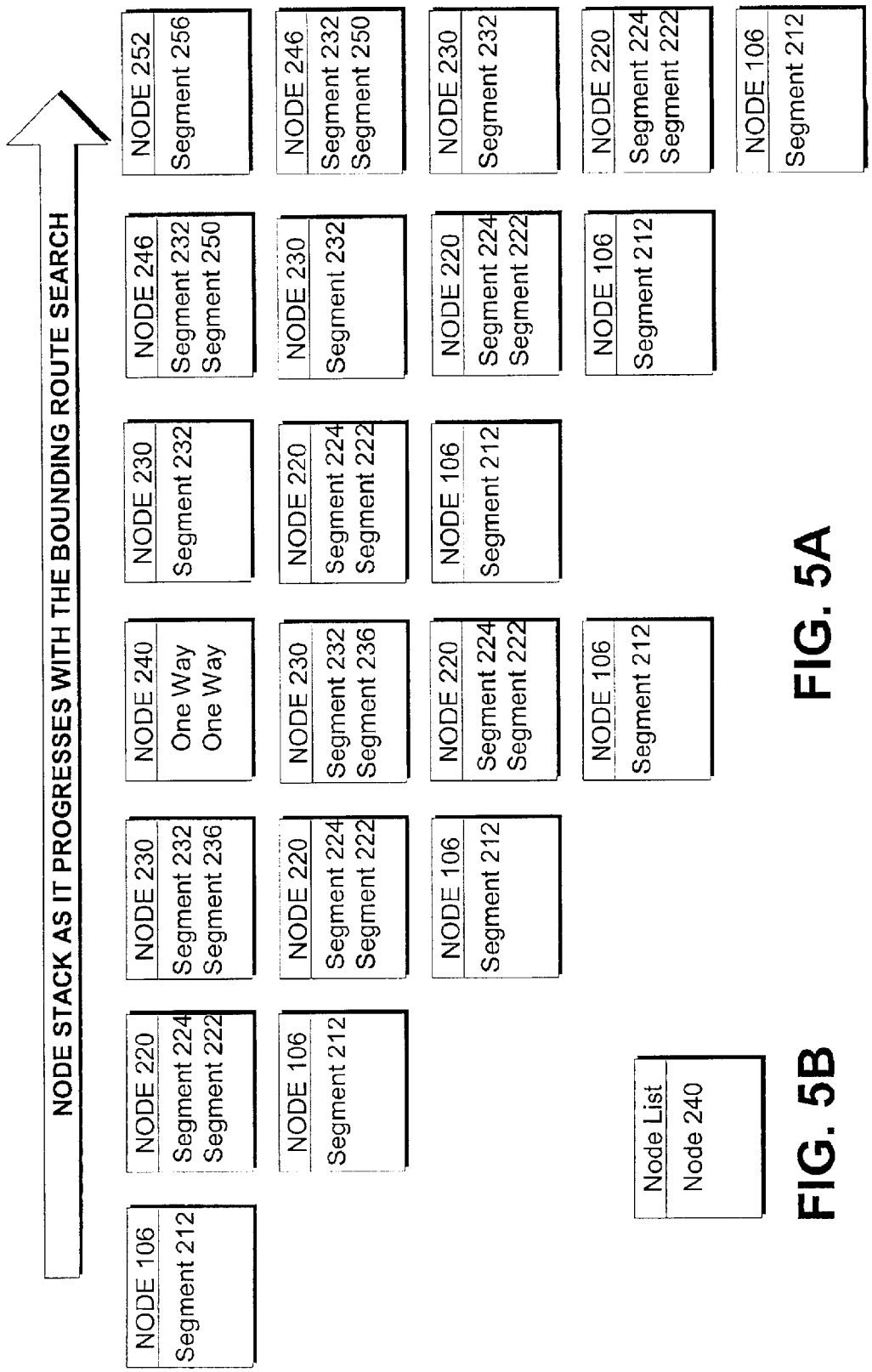
FIGS. 5A and 5B show an exemplary node stack and node list as the bounding search progresses through the road network of FIG. 4.

FIGS. 5A and 5B illustrate an exemplary node stack and node list as generated through the progression of the bounding route search of FIG. 4. Both the node stack and the node list are initially empty. For each node that is visited by the boundary route search an entry is added to the node stack. Then, the node stack may enable the search to backup, for example, when a dead-end road is reached. Also, the node stack may record the segments from each node that have not yet been searched. The node list keeps track of nodes that connect only those segments that have already been searched. Consequently, nodes placed on the node list arc removed from the node stack to prevent them from being searched again when determining the bounding route.

As described above with relation to determining a bounding route, a candidate node is evaluated for the best segment corresponding to the specific criterion. The candidate node is then placed onto the node stack. Along with each node is a list of segments that leave the node and have not yet been searched. In the above example, the bounding route search was initiated at the origin 106. Origin 106 would be listed with segment 212, because segment 212 was an un-searched segment attached to the origin 106. The next node evaluated was node 220, which would be listed with un-searched segments 222 and 224, in addition to the un-searched segment 212. The process of placing nodes on the node list may continue until the bounding route was determined. Ultimately, as shown in the above example, the bounding route is the route formed between the list of nodes in the node stack. For example, recall that the above route included nodes 106, 220, 230, 246, and 252. These nodes are listed in the node stack at the end of the bounding route search, along with any unselected segments.

Moreover, note that node 240 might be placed on the node list. It should be noted that a segment that exits a node can result in a dead-end condition such that the segment itself dead-ends or the segment leads to a node that is either on the node stack or on the node list. If the later case occurs (i.e., on the node list) the bounding route search has gone in a circle, which is often undesirable. Therefore, to prevent searching previously searched nodes and segments, when a segment that is searched dead-ends, the next best segment leaving the node is then searched. When all the segments that exit a node result in dead-ends or one ways leading to the node, the search places the node in the node list and backs-up to the previous node in the stack deleting the node from the node stack. This keeps the node stack containing only nodes that are used to construct the bounding route. Node 240 is essentially a dead-end road in this instance since only one-way roads lead into the node 240. Thus, the bounding route search may back up to node 230 and consequently place node 240 on the node list to prevent searching node 240 to determining the bounding route.

An alternative to maintaining a node list is maintaining a list of segments that are classified as dead-end segments. Segments that dead-end or only connect to nodes with already searched segments would be placed onto the list of segments. Before a segment is searched, the bounding route search may first verify that the segment is not on the segment list. This approach would also eliminate circling bounding path.

IV. Using the Bounding Route in Subsequent Route Calculations

A. Using the Bounding Route as a Boundary

Figure 6:
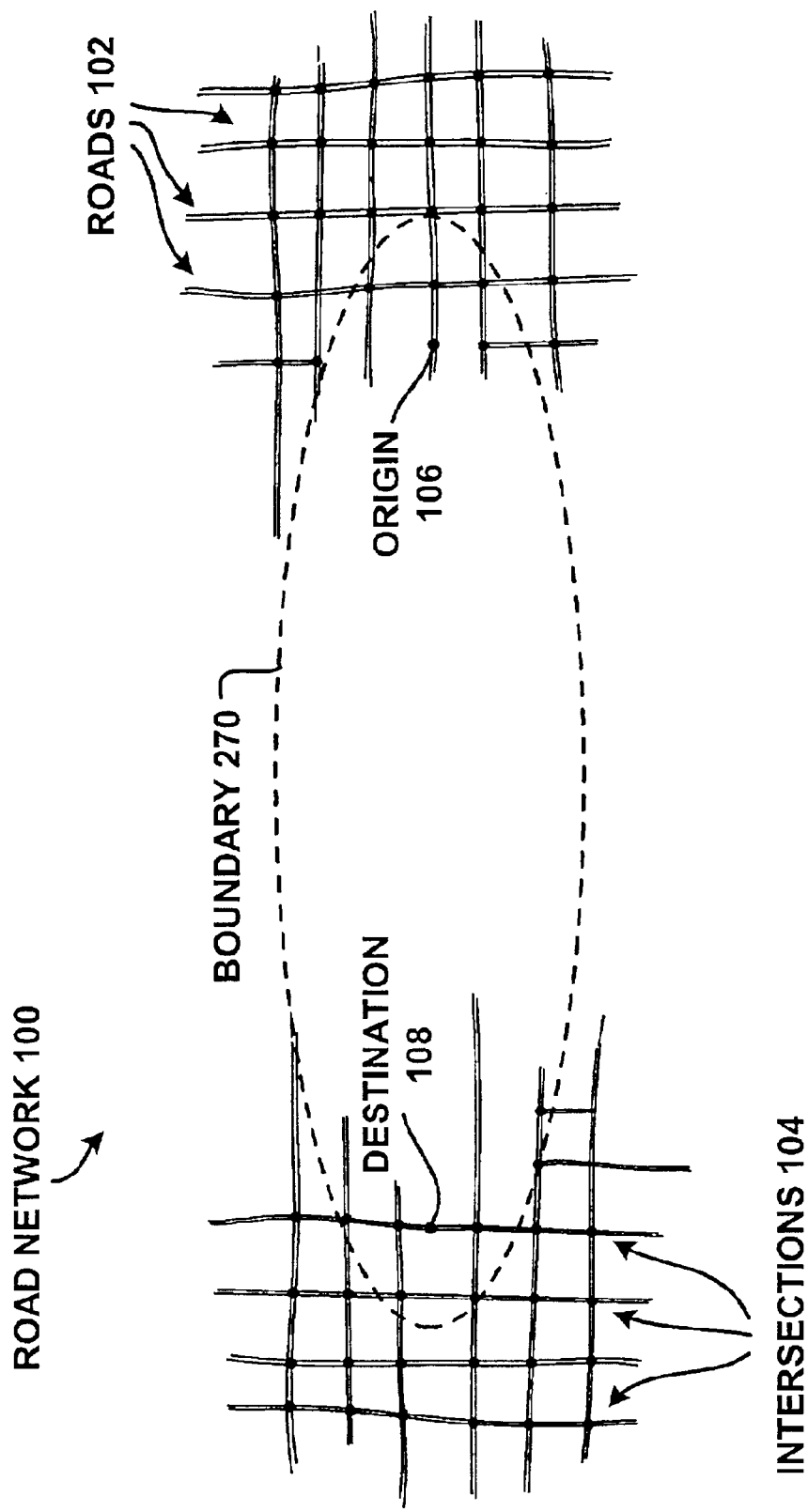
FIG. 6 shows an exemplary boundary formed from a boundary value.

FIG. 6 illustrates an exemplary boundary 270 formed from the bounding route calculated in an earlier example. Depending on the criterion, however, the bounding route's value in distance or length in time is determined. This value is used as criteria that subsequent route calculations, such as search algorithms known as the A*algorithm, Dykstra algorithm and so on, may be compared to. The boundary, or criteria, reduces the search area for an calculating an optimized route. This can reduce the processing time to calculate subsequent routes by comparing to an "upper bound" criteria. If the route search has exceeded the criteria, or equivalently, the search has gone beyond the boundary, the search is stopped at a particular location in order to pursue a potentially better route at a different location. This allows a search to be stopped before it actually reaches the destination by comparing at a third location, or node, the length of the segments selected in the search to the length of the bounding route.

B. Overview of a Navigation System with a Database

Figure 7:
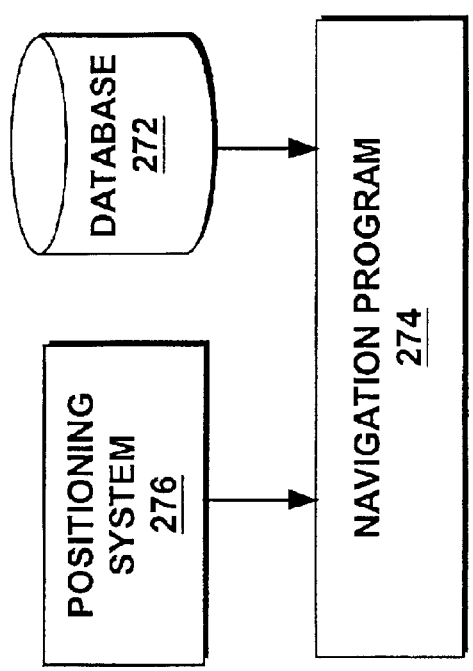
FIG. 7 shows a computer usable database(s) that represents a road network as data for use by a navigation program.

Referring to FIG. 7, data representing the road network 100, and more specifically the segments and nodes, is represented in a computer usable database(s) 272 for use by a computer based application such as a navigation program 274. Accordingly, the data may be arranged, structured, and/or stored in a data structure format for storage on the database(s) 272. The navigation program 274 may optionally use other equipment such as a positioning system 276 to determine the end-user's physical location.

Figure 8:
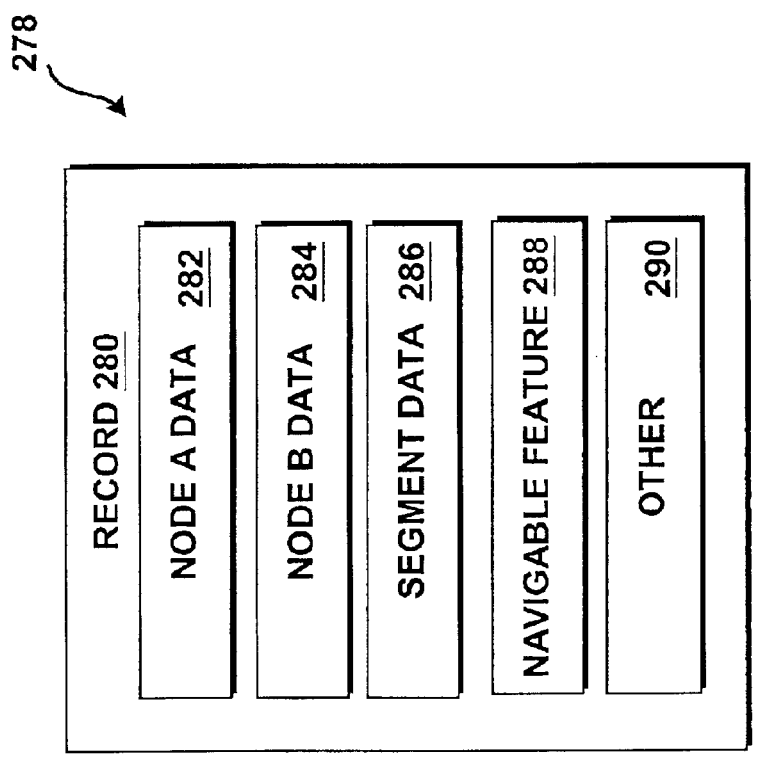
FIG. 8 shows an exemplary data structure representing a road segment delimited by two associated nodes, node A and node B.

FIG. 8 illustrates an exemplary data structure 278 representing a road segment delimited by two associated nodes, node A and node B. In an exemplary embodiment, the data structure 278 includes data fields 282, 284, 286, 288, and 290 to store data that represent the segment and its two nodes. Generally, each segment in the road network 100 may be represented by a data structure in the database 272. In an exemplary embodiment, the data structure 278 may include a record 280, but in an alternate embodiment the database structure may include a file, list, array, tree, table, and so on, depending on the particular application.

According to the exemplary embodiment, the record 280 may have associated with it data that allows identification of the nodes associated with the segment and/or the geographic positions (e.g., the latitude and longitude coordinates) of the two nodes. Such information may be placed as attributes in the fields 282, 284, and 286 in the data structure 278 for node A, node B, and the segment, respectively, as shown in FIG. 4.

The record 280 may also have associated with it other useful information, for example more attributes may be placed in other fields 290 that specify the speed of travel on the portion of the roadway represented by the segment, the direction of travel permitted on the road portion represented by the segment, what if any turn restrictions exist at each of the nodes which correspond to intersections at the ends of the road portion represented by the segment, the street address ranges of the roadway portion represented by the segment, and so on as desired.

In addition, each record 280 that represents an other-than-straight shape of the road segment may include one or more shape point data that define the other-than-straight shape of the road segment. These various attributes associated with a segment may be included in a single data structure 278, or may be included in more than one type of data structure that are related or cross-referenced to each other.

In the database 272 that stores/holds the data, which represents the road network 100, there may also be a data structure for each node in the geographic region. The node data structure may have associated with it information that allow identification of the segment(s) that connect to it and/or its geographic position such as its latitude and longitude coordinates.

According to an exemplary embodiment, a navigation program 274 may use the data structure 278 for the segments in the database 272 to calculate the bounding route between the two locations in the geographic region.

C. Overview of Route Calculation

Calculating a route may include forming a search tree in a direction (one search from the origin or one search from the destination). When a segment is expanded by a search, its one or more successor segments may be identified at the segment's nodes and added to its respective search tree, thereby growing the tree of possible routes. Thus, each search tree is grown by identifying successor segments from the origin, or conversely from the destination. As the tree grows, it is checked to determine whether a solution route exists between the origin and the destination. A solution exists when a segment and/or node in one search tree (origin) matches to a common segment and/or node appearing in the other search tree (destination).

(1) Route Calculation Optimized for Least Distance Traveled

Figure 9A:
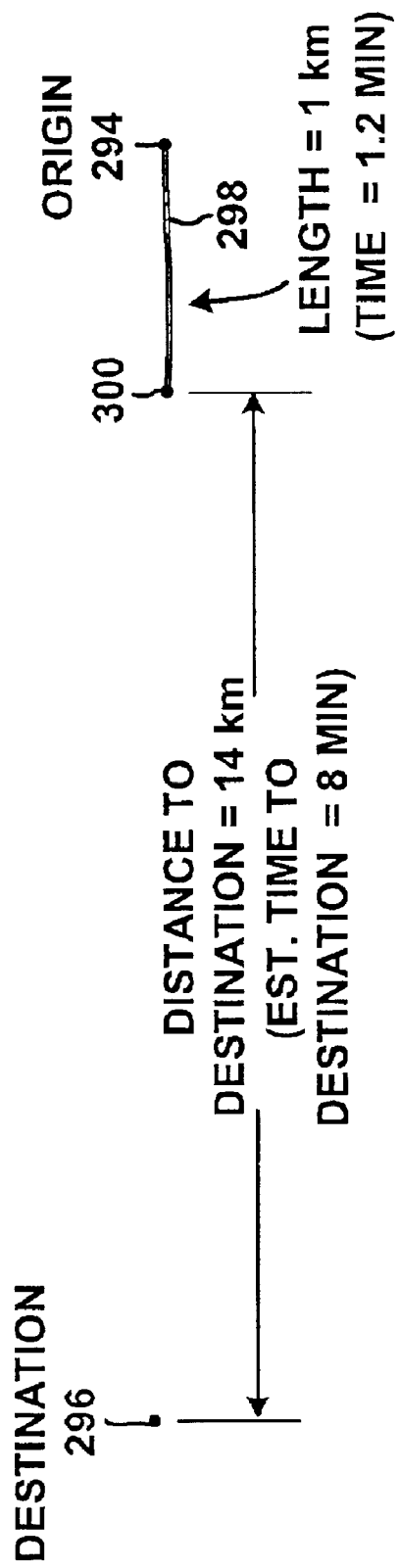
FIGS. 9A, 9B, and 9C show an exemplary search optimized for a specific criterion as it progresses through a road network.
Figure 9B:
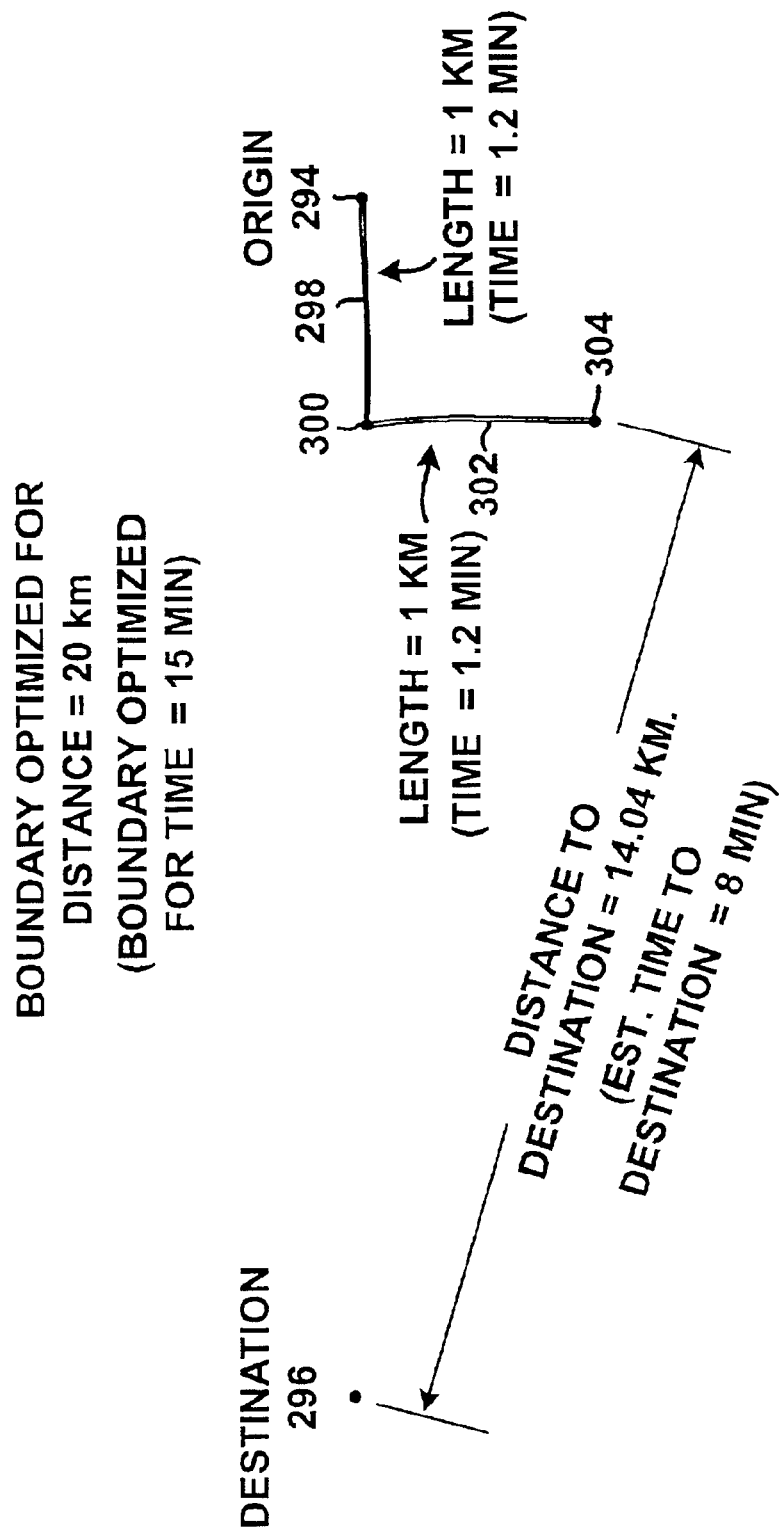
Figure 9C:
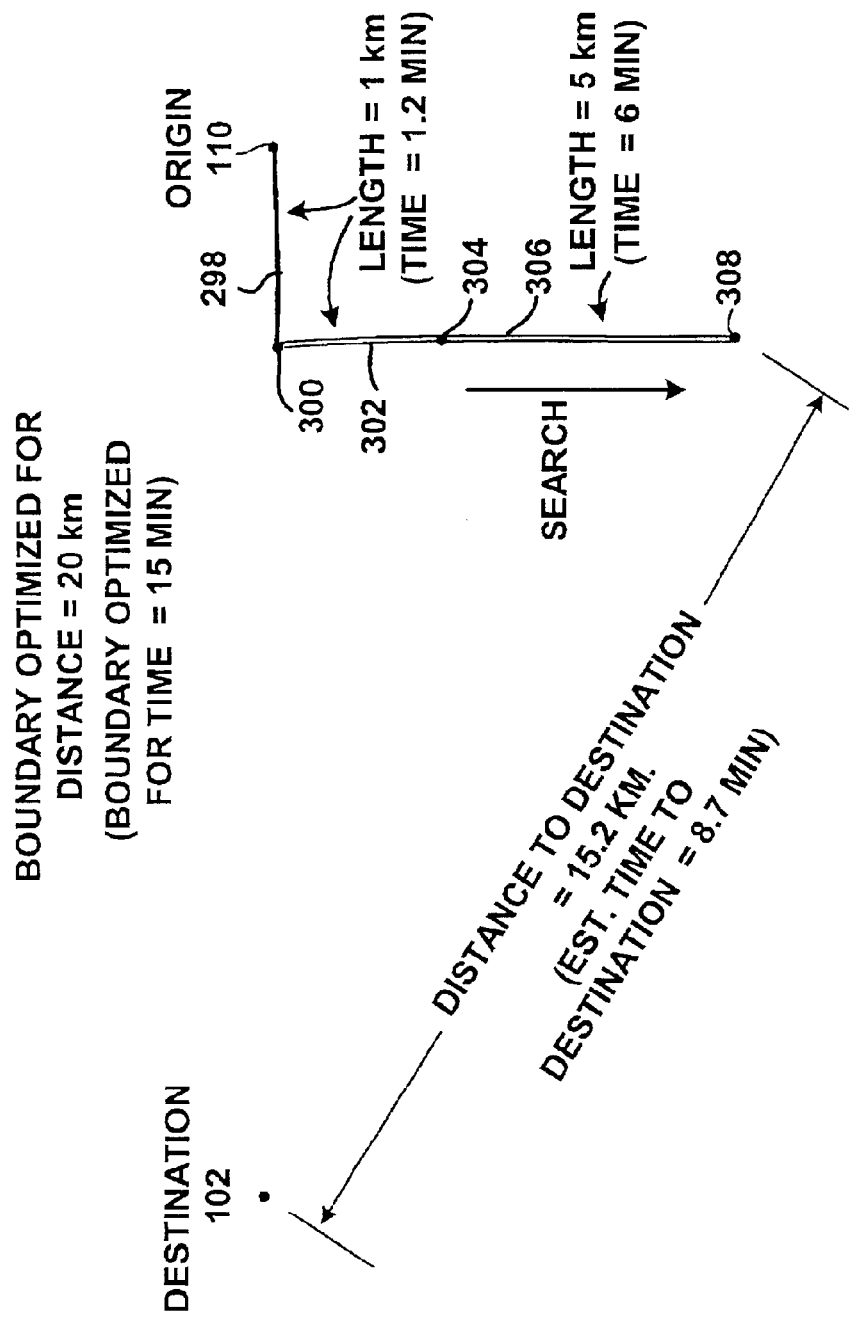

FIGS. 9A, 9B, and 9C illustrate an exemplary search optimized for distance as it progresses through a road network. Assume for this example that, using one of described techniques above, a bounded route value was calculated to be 20 kilometers (or 20 km). Then, the subsequent route searches optimized for distance may search for routes between the two locations that are less than 20 km in length or else the search is stopped from searching any more segments at that particular location.

Referring first to FIG. 9A, a search is initiated at the origin 294 and spreads outwardly toward the destination 296 along segment 298 to node 300. The length of the segment 298 is calculated and determined to be 1 km. To determine whether the search meets or betters the value (the length of the route should not exceed 20 km), the distance between the destination 296 and the node 300 is calculated. In this example, assume that the distance between the destination 296 and the node 300 is 14 km. This calculation represents the least possible distance one must travel to reach the destination 296 from node 300, and may not necessarily represent the actual distance the end solution will be. Therefore, in this example, 1 km+14 km=15 km, which is less than 20 km, so the search may continue at node 300.

FIG. 9B illustrates the search initiated in FIG. 9A, but the search has continued further along segment 302 to node 304. Note, the search may spread further in other directions to form a tree search, such as described above, but such an example is not shown. The length of the segment 302 is determined to be 1 km. Furthermore, the distance between the destination 296 and the node 304 is determined to be 14.04 km. Therefore, 1 km (segment 298)+1 km (segment 302)+14.04=16.04 km, which is still within the 20 km boundary value. Thus, the search continues at node 304.

FIG. 9C illustrates the search that has spread from node 304 along segment 306 to node 308. The length of the segment 306 is determined to be 5 km, and the distance between the destination 296 and the node 308 is 15.2 km. Therefore, 1 km (segment 298)+1 km (segment 302)+5 km (segment 306)+15.2 km=22.2 km. Recall, that the boundary value was set at 20 km, thus the search in this direction (along segment 306 from node 304 to node 308) is stopped, because this search will result in an un-optimal solution.

(2) Route Calculation Optimized for Least Travel Time

In another embodiment, the navigation program 274 may calculate a route between two locations optimized for least travel time by using search techniques such as those described above and searching a geographical area that is encompassed by a boundary value. As described above, the program 274 then need only to search segments and their corresponding records in the database 272 of FIG. 3 that are geographically positioned within the bounded search area to determine an optimum route.

Turning again to FIGS. 9A, 9B, and 9C, an exemplary search optimized for time as it progresses through a road network is also illustrated. Assume for this example that, using one of described time optimization techniques above, a boundary value was determined to be 15 minutes (or 15 min.). Then, the search optimized for time may search for routes between the two locations that are less than 15 min. or else the search is stopped from search any more segments in that particular direction. All segments geographically positioned within the search area may be searched until the optimum route is found.

Referring first to FIG. 9A, a search is initiated at the origin 294 and spreads outwardly toward the destination 296 along segment 298 to node 300. The length of the segment 298 is calculated and determined to be 1 km and the posted speed limit is 50 kilometers per hour (50 km/h). Thus, the distance traveled per unit of time across segment 298 is 1/50 hour, or equivalently, 1.2 minutes. To determine whether the search is within the boundary, the distance between the destination 296 and the node 300 is determined. In this example, assume that the distance between the destination 296 and the node 300 is 14 km and assume the estimated maximum posted speed limit is 105 km/h. Thus, the estimated minimum time needed to travel between node 296 and 300 is 8 minutes. This measurement represents the least possible time it may take for one to reach the destination 296 from node 300. Therefore, 1.2 minutes (segment 298)+8 minutes=9.2 minutes, which is less than the 15 minute boundary, so the search may continue at node 300.

Note that the estimated time needed to travel between the destination 296 and the node 300 is estimated based on a high posted speed limit and does not take into account possible intersections and other associated costs and therefore provides the quickest time possible to travel between the two locations. However, it should be understood that node intersections costs and varying speed limits or other maximum speed limits (e.g., the autobahn speed limit may be higher than 105 km/h) may be used to estimate the time needed to travel between the destination 296 and the node 300.

FIG. 9B illustrates the search initiated in FIG. 9A, but the search has spread further along segment 302 to node 304. Note, the search may spread further in other directions to form a tree search, such as described above, but not shown in this example. The length of the segment 302 is calculated and determined to be 1 km, again assuming that the posted speed limit for the segment 302 is 50 km/h. Thus, the distance traveled per unit of time across segment 298 is 1/50 hour, or equivalently, 1.2 minutes. Furthermore, the distance between the destination 296 and the node 304 is calculated. In this example, the distance between the destination 296 and the node 304 is 14.04 km and assume the estimated posted speed limit is 105 km/h. Thus, the estimated time needed to travel between node 296 and 300 is approximately 8 minutes. Therefore, 1.2 min. (segment 298)+1.2 min. (segment 302)+8 min.=10.4 min, which is still within the 15 min. boundary. Thus, the search continues at node 304.

FIG. 9C illustrates the search that has spread from node 304 along segment 306 to node 308. The length of the segment 306 is calculated and determined to be 5 km and assume the estimated posted speed limit is 50 km. Thus, the estimated time needed to travel between node 306 and 308 is 6 minutes, and the time calculated between the destination 296 and the node 308 is 15.2 km at 105 km/h is 8.7 minutes. Therefore, 1.2 min. (segment 298)+1.2 min. (segment 302)+6 min. (segment 306)+8.7 min.=17.1 min. Recall, that the boundary was set at 15 min., thus the search in this direction (along segment 306 from node 304 to node 308) is stopped, so that other possible routes between the two locations may be calculated which optimize the distance.

V. Alternate Embodiments

A. Segments of Roads Classified by Rank

Referring to the database 272 in FIG. 7, the segments of roads may be classified by rank in accordance with the importance or significance of the roadway for vehicle travel (and for walking if so desired and programmed). For example, segments of roadways of rank "0" may be alleyways and side streets, roadways of rank "1" may be primary city streets, roadways of rank "2" may be highways, and so on. Each road segment data record in the map database 272 also identifies the rank of the corresponding portion of the roadway that it represents. Accordingly, the lowest layer ("0") contains records that represent roadways of all ranks, the next higher layer ("1") contains roadways of rank "1" and higher, the next higher layer ("2") contains roadways of rank "2" and higher, and so on. The road segment records may include additional information about the represented road segments, such as the speeds along the represented road segments, turn restrictions, weight restrictions, the names of the roads that the segments are parts of, address ranges along the road segments, and so on. In an alternative embodiment, the database 272 may include more than one rank of road in a single layer. The database 272 may include additional information as well.

Once a bounding route value is determined, the searches compared to the bounding route or those searches that are within the boundary may not necessarily be limited to any particular layer (e.g., layer 0, 1, 2, etc.), but according to this alternate embodiment, the searches may be restricted to a particular layer. For example, an end-user may want to travel only over primary streets or faster roads and not necessarily side streets to get to a particular destination. Thus, the search may limited to searching for routes on layer 1 that includes all rank 1 and higher rank roads.

B. Converging Bounding Route

Assume that a bounding route is determined, which has a determined value. Then, when a subsequent route is calculated that "betters" the value of the bounding route according to the particular criterion, the value of the subsequent route may instead become the bounding route value. Then, any additional routes calculated may be compared to this new bounding route value. Thus, the bounding route value converges until the optimum solution is found.

VI. Advantages

A bounding route is calculated between two physical locations to determine a boundary value for which subsequent route calculations or portions thereof may be compared to. The bounding route may be calculated by selecting segments of roads that satisfy certain criterion, such as the "least distance traveled" or the "least travel time." The boundary may then provide any route calculation program with a value to determine whether a search at a particular location, or node, should continue. That is, if a search at a particular location has exceeded the criteria, or equivalently, the search has gone beyond the boundary, the search is stopped in order to pursue a potentially better route at a different location. This process may then be an iterative one until an optimal solution is found.

By reducing the geographic area and consequently the data considered in the route calculation, the route calculation program may operate in a computationally efficient manner. Moreover, subsequent searches may be stopped early by the program, before actually calculating a complete route, by estimating the remaining characteristic value of the route and comparing the estimated route value to the value of the bounding route. If the estimated route value exceeds the value of the bounding route, the search is stopped. In addition to the calculation of a route for driving to the desired destination, the navigation program may use data in the geographic database to calculate one or more routes to reach the desired destination by waldling.

It should also be understood that the programs, processes, methods and systems utilized or described herein are not related or limited to any particular type of vehicle positioning or database system, unless indicated otherwise. For example, positioning systems in planes, boats, and handheld systems may utilize the methods exemplified herein. In view of the wide variety of embodiments to which the principles of the present embodiments can be applied, it should be understood that the illustrated embodiments are exemplary only, and should not be taken as limiting the scope of the present invention. For example, more or fewer elements may be used in the figures. And other criterion may be used for optimizing the route.

The claims should not be read as limited to the described order or elements unless stated to that effect. All embodiments that come within the scope and spirit of the following claims and equivalents thereto are claimed as the invention.

What is claimed is:

1. A method for calculating an optimal route from a first location to a second location along a road network located in a geographic region using a geographic database that represents the road network, wherein the optimal route has a characteristic optimized for a specific criterion, the method comprising the steps of:

with a relatively fast algorithm optimized for the specific criterion of the characteristic, determining a trial route from the first location to the second location using the geographic database, determining a boundary value for the characteristic, wherein the boundary value is that value by which the characteristic of the trial route meets the criterion; and from all possible routes between the first location and the second location that have a value for the characteristic that is less than the boundary value, selecting as the optimal route that route that has an optimal value for the characteristic.

2. The method of claim 1 wherein the characteristic is travel time and the specific criterion is least travel time.

3. The method of claim 1 wherein the characteristic is distance traveled and the specific criterion is least distance traveled.

4. The method of claim 1 wherein the characteristic is a combination of travel and distance and the specific criterion is speed.

5. The method of claim 1 wherein if one of the subsequent route calculations has exceeded the boundary value, the route calculation is stopped to pursue a potentially better route at a different location.

6. The method of claim 1 wherein the algorithm is one of the A* algorithm and the Dykstra algorithm.

7. A route calculation program for use in a navigation system, the route calculation program adapted to calculate an optimal route from a first location to a second location along a road network located in a geographic region using a geographic database that represents the road network, wherein the optimal route has a characteristic optimized for a specific criterion, the route calculation program comprising the steps of:

determining a bounding route between the first location and the second location by selecting segments of roads that have characteristics that best satisfy the specific criterion;

determining a boundary value by assessing the characteristics of each selected segment of road of the bounding route; and selecting as the optimal route among all possible routes that has an optimal value for the characteristics of all subsequent route calculations that have a value for the characteristic that is less than the boundary value.

8. The invention of claim 7 wherein the characteristic of each segment is travel time and the criterion is least time traveled.

9. The invention of claim 7 wherein the characteristic of each segment is distance traveled and the criterion is least distance traveled.

10. The invention of claim 7 wherein the boundary value is optimized for the criterion.

11. A method for calculating an optimal route from a first location to a second location along a road network located in a geographic region using a geographic database that represents the road network, wherein the optimal route has a characteristic optimized for a specific criterion, the method comprising the steps of:

with a relatively fast algorithm optimized for the specific criterion, determining a boundary route from the first location to the second location using the geographic database, determining a boundary value for the characteristic, wherein the boundary value is that value by which the characteristic of the boundary route meets the specific criterion; and performing an exhaustive search of all possible routes between the first location and the second location that have a value for the characteristic that is less than the boundary value, selecting one of the all possible routes as the optimal route that has an optimal value for the characteristic.

12. The method of claim 11 wherein a node stack is generated to prioritize searched nodes and previously un-searched segments associated with the searched nodes.

13. The method of claim 12 wherein the node stack permits the algorithm to "back-up" to a node listed on the node stack.

14. The method of claim 11 wherein the exhaustive search comprises searching only those routes on a specific layer.

* * * * *